(12) United States Patent
Ferrari et al.

(10) Patent No.: US 10,715,752 B2
(45) Date of Patent: Jul. 14, 2020

(54) SYSTEM AND METHOD FOR MONITORING SENSOR PERFORMANCE ON AN AGRICULTURAL MACHINE

(71) Applicants: CNH Industrial Canada, Ltd., Saskatoon (CA); Autonomous Solutions, Inc., Mendon, UT (US)

(72) Inventors: Luca Ferrari, Formigine (IT); John H. Posselius, Ephrata, PA (US); James W. Henry, Saskatoon (CN); Taylor C. Bybee, Logan, UT (US); Bret T. Turpin, Wellsville, UT (US)

(73) Assignees: CNH Industrial Canada, Ltd., Saskatoon, Saskatchewan (CA); Autonomous Solutions, Inc., Mendon, UT (US)

( * ) Notice: Subject to any disclaimer, the term of this patent is extended or adjusted under 35 U.S.C. 154(b) by 0 days.

(21) Appl. No.: 16/001,405

(22) Filed: Jun. 6, 2018

(65) Prior Publication Data
US 2019/0379847 A1 Dec. 12, 2019

(51) Int. Cl.
*H04N 5/367* (2011.01)
*A01B 76/00* (2006.01)
(Continued)

(52) U.S. Cl.
CPC ............ *H04N 5/3675* (2013.01); *A01B 76/00* (2013.01); *B60R 1/00* (2013.01); *B60S 1/603* (2013.01);
(Continued)

(58) Field of Classification Search
CPC ... A01B 79/005; A01B 69/008; A01B 69/001; A01B 71/08; A01B 35/32; G05D 2201/0201; G05D 1/0246; G05D 1/0278; G05D 1/0088; G05D 1/0217; G05D 1/0223; G05D 1/027
See application file for complete search history.

(56) References Cited

U.S. PATENT DOCUMENTS 5,148,378 A 9/1992 Shibayama et al.
5,227,121 A 7/1993 Scarola et al.
(Continued)

FOREIGN PATENT DOCUMENTS

CN 204362560 U 6/2015

*Primary Examiner* — Dave Czekaj
*Assistant Examiner* — Kehinde Abimbola
(74) *Attorney, Agent, or Firm* — Rebecca L. Henkel; Rickard K. DeMille

(57) ABSTRACT

In one aspect, a system for monitoring sensor performance on an agricultural machine may include a controller configured to receive a plurality of images from the vision-based sensor mounted on an agricultural machine. The controller may be configured to determine an image parameter value associated with each of a plurality of pixels contained within each of the plurality of images. For each respective pixel of the plurality of pixels, the controller may be configured to determine a variance associated with the image parameter values for the respective pixel across the plurality of images. Furthermore, when the variance associated with the image parameter values for a given pixel of the plurality of pixels falls outside of a predetermined range, the controller may be configured to identify the given pixel as being at least one of obscured or inoperative.

20 Claims, 6 Drawing Sheets

(51) Int. Cl.
  *B60R 1/00* (2006.01)
  *B60S 1/60* (2006.01)
  *G06T 7/00* (2017.01)
  *G06T 7/90* (2017.01)
  *H04N 5/225* (2006.01)
  *B60S 1/04* (2006.01)

(52) U.S. Cl.
  CPC ............ *G06T 7/90* (2017.01); *G06T 7/97* (2017.01); *H04N 5/2253* (2013.01); *B60S 1/04* (2013.01)

(56) References Cited

U.S. PATENT DOCUMENTS

| | | | |
|---|---|---|---|
| 6,555,986 B2 | 4/2003 | Moberg | |
| 6,662,091 B2 | 12/2003 | Wilson et al. | |
| 6,687,654 B2 | 2/2004 | Smith, Jr. et al. | |
| 8,519,348 B2 | 8/2013 | Topfer et al. | |
| 8,566,047 B2 | 10/2013 | Montreuil et al. | |
| 8,818,567 B2 | 8/2014 | Anderson | |
| 8,868,304 B2 | 10/2014 | Bonefas | |
| 8,928,486 B2 | 1/2015 | Hui et al. | |
| 8,963,733 B2 | 2/2015 | Kar et al. | |
| 9,282,688 B2 | 3/2016 | Casper et al. | |
| 9,554,098 B2 | 1/2017 | Casper et al. | |
| 9,574,903 B2 | 2/2017 | Vilim et al. | |
| 9,785,653 B2* | 10/2017 | Bercovich | G06F 16/5866 |
| 10,255,670 B1* | 4/2019 | Wu | G06T 7/0004 |
| 10,261,962 B2* | 4/2019 | Bercovich | G06F 16/5866 |
| 2004/0075661 A1* | 4/2004 | Yamaguchi | G06T 1/20 345/441 |
| 2008/0231027 A1* | 9/2008 | Luo | G06K 9/00369 280/735 |
| 2009/0087078 A1* | 4/2009 | Sun | G06T 7/0006 382/141 |
| 2009/0174773 A1 | 7/2009 | Gowdy et al. | |
| 2012/0328190 A1* | 12/2012 | Bercovich | G06F 16/5866 382/165 |
| 2014/0232869 A1* | 8/2014 | May | H04N 7/18 348/148 |
| 2016/0379067 A1* | 12/2016 | May | H04N 7/18 382/103 |
| 2017/0112043 A1 | 4/2017 | Nair et al. | |
| 2018/0004775 A1* | 1/2018 | Bercovich | G06F 16/5866 |
| 2018/0338422 A1* | 11/2018 | Brubaker | H04N 1/00129 |
| 2019/0150357 A1* | 5/2019 | Wu | A01C 21/007 |

\* cited by examiner

SYSTEM AND METHOD FOR MONITORING SENSOR PERFORMANCE ON AN AGRICULTURAL MACHINE

FIELD

The present disclosure generally relates to agricultural machines and, more particularly, to systems and methods for monitoring sensor performance, such as vision-based sensor performance, on an agricultural machine.

BACKGROUND

Agricultural implements, such as cultivators, disc harrows, seeders, and/or the like, perform one or more agricultural operations while being towed across a field by a suitable work vehicle, such as in agricultural tractor. In this regard, agricultural implements often include one or more sensors mounted thereon to monitor various parameters associated with the performance of such agricultural operations. For example, some agricultural implements include one or more cameras or other vision-based sensors that capture images of the soil and/or plants within the field. Thereafter, such images may be processed or analyzed to determine one or more parameters associated with the condition of soil and/or plants, such as parameters related to soil roughness, plant health, weed growth, and/or the like.

During the performance of many agricultural operations, the implement typically generates large amounts of dust and other airborne particulate matter. In this regard, dust may adhere to the lens(es) of the camera(s) mounted on the implement in such a manner that one or more pixels of the cameras(s) are obscured or otherwise blocked from receiving light. Furthermore, large amounts of dust present within the field(s) of view of the camera(s) may also obscure various pixels of the camera(s). Image data captured by cameras having obscured pixels may have low quality, thereby resulting in poor camera performance.

Accordingly, an improved system and method for monitoring sensor performance on an agricultural machine would be welcomed in the technology.

BRIEF DESCRIPTION

Aspects and advantages of the technology will be set forth in part in the following description, or may be obvious from the description, or may be learned through practice of the technology.

In one aspect, the present subject matter is directed to a system for monitoring sensor performance on an agricultural machine. The system may include an agricultural machine and a vision-based sensor mounted on the agricultural machine, with the vision-based sensor being configured to capture a plurality of images. The system may also include a controller communicatively coupled to the vision-based sensor. The controller may be configured to receive the plurality of images from the vision-based sensor and determine an image parameter value associated with each of a plurality of pixels contained within each of the plurality of images. For each respective pixel of the plurality of pixels, the controller may also be configured to determine a variance associated with the image parameter values for the respective pixel across the plurality of images. Furthermore, when the variance associated with the image parameter values for a given pixel of the plurality of pixels falls outside of a predetermined range, the controller may also be configured to identify the given pixel as being at least one of obscured or inoperative.

In another aspect, the present subject matter is directed to a method for monitoring sensor performance on an agricultural machine. The method may include receiving, with a computing device, the plurality of images from the vision-based sensor. The method may also include determining, with the computing device, an image parameter value associated with each of a plurality of pixels contained within each of the plurality of images. Moreover, the method may include, for each respective pixel of the plurality of pixels, determining, with the computing device, a variance associated with the image parameter values for the respective pixel across the plurality of images. Furthermore, the method may include, when the variance associated with the image parameter values for a given pixel of the plurality of pixels falls outside of a predetermined range, identifying, with the computing device, the given pixel as being at least one of obscured or inoperative. The method may further include determining, with the computing device, when the vision-based sensor is obscured or inoperative based on a number or a density of individual pixels of the plurality of pixels that have been identified as being obscured or inoperative. Additionally, the method may include initiating, with the computing device, a control action when it is determined that the vision-based sensor is obscured or inoperative.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
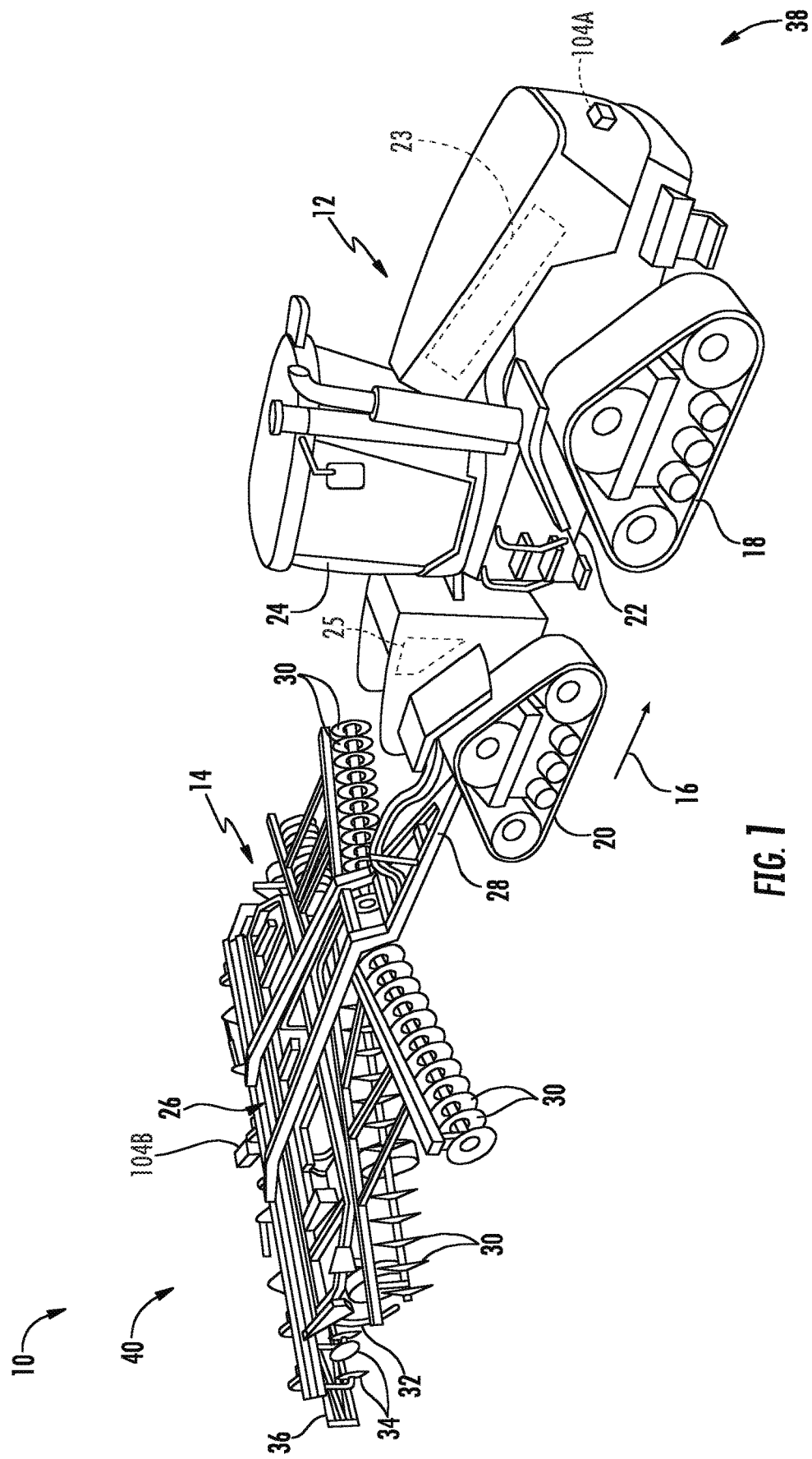
FIG. 1 illustrates a perspective view of one embodiment of an agricultural machine in accordance with aspects of the present subject matter, particularly illustrating the agricultural machine including a work vehicle and associated implement.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for monitoring sensor performance on an agricultural machine. In general, a controller of the disclosed system may be configured to determine when one or more pixels of a vision-based sensor (e.g., a camera) mounted on the agricultural machine are obscured or otherwise effectively inoperative. Specifically, in several embodiments, the controller may be configured to receive a plurality of images from the vision-based sensor. Furthermore, the controller may then be configured to determine an image parameter value associated with each of a plurality of pixels contained within each of the received images. For example, in one embodiment, the controller may be configured to determine an intensity value associated with each pixel contained within each of the received images. Thereafter, for each respective pixel, the controller may be configured to determine a variance associated with the image parameter values for each respective pixel across the received images. For instance, in one embodiment, the controller may be configured to determine a differential or range between the determined intensity values for each respective pixel across the received images. When the variance associated with the image parameter values for a given pixel falls outside of a predetermined range, the controller may be configured to identify the given pixel as obscured or inoperative.

Referring now to drawings, FIG. 1 illustrates a perspective view of one embodiment of an agricultural machine 10 in accordance with aspects of the present subject matter. As shown, in the illustrated embodiment, the agricultural machine 10 includes a work vehicle 12 and an associated agricultural implement 14. In general, the work vehicle 12 is configured to tow the implement 14 across a field in a direction of travel (e.g., as indicated by arrow 16 in FIG. 1). As shown, the work vehicle 12 may be configured as an agricultural tractor and the implement 14 may be configured as an associated tillage implement. However, in other embodiments, the work vehicle 12 may be configured as any other suitable type of vehicle, such as an agricultural harvester, a self-propelled sprayer, and/or the like. Similarly, the implement 14 may be configured as any other suitable type of implement, such as a planter. Furthermore, it should be appreciated that the agricultural machine 10 may correspond to any suitable powered and/or unpowered agricultural machine (including suitable vehicles and/or equipment, such as only a work vehicle or only an implement). Additionally, the agricultural machine 10 may include more than two associated vehicles, implements, and/or the like (e.g., a tractor, a planter, and an associated air cart).

As shown in FIG. 1, the work vehicle 12 includes a pair of front track assemblies 18, a pair or rear track assemblies 20, and a frame or chassis 22 coupled to and supported by the track assemblies 18, 20. An operator's cab 24 may be supported by a portion of the chassis 22 and may house various input devices (e.g., a user interface 102 shown in FIG. 3) for permitting an operator to control the operation of one or more components of the work vehicle 12 and/or one or more components of the implement 14. Additionally, as is generally understood, the work vehicle 12 may include an engine 23 and a transmission 25 mounted on the chassis 22. The transmission 25 may be operably coupled to the engine 23 and may provide variably adjusted gear ratios for transferring engine power to the track assemblies 18, 20 via a drive axle assembly (not shown) (or via axles if multiple drive axles are employed).

Additionally, as shown in FIG. 1, the implement 14 may generally include a carriage frame assembly 26 configured to be towed by the work vehicle 12 via a pull hitch or tow bar 28 in the direction of travel 16 of the vehicle 12. As is generally understood, the carriage frame assembly 26 may be configured to support a plurality of ground-engaging tools, such as a plurality of shanks, disk blades, leveling blades, basket assemblies, tines, spikes, and/or the like. For example, in the illustrated embodiment, the carriage frame assembly 26 is configured to support various gangs of disc blades 30, a plurality of ground engaging shanks 32, a plurality of leveling blades 34, and a plurality of crumbler wheels or basket assemblies 36. However, in alternative embodiments, the carriage frame assembly 26 may be configured to support any other suitable ground engaging tools and/or combination of ground engaging tools. In several embodiments, the various ground-engaging tools may be configured to perform a tillage operation or any other suitable ground-engaging operation across the field along which the implement 14 is being towed. It should be understood that, in addition to being towed by the work vehicle 12, the implement 14 may also be a semi-mounted implement connected to the work vehicle 12 via a two point hitch (not shown) or the implement 14 may be a fully mounted implement (e.g., mounted the work vehicle's 12 three point hitch (not shown)).

Furthermore, in accordance with aspects of the present subject matter, the agricultural machine 10 may include one or more vision-based sensors 104 coupled thereto and/or supported thereon. As will be described below, each vision-based sensor 104 may be configured to capture image data and and/or other vision-based data from the field (e.g., of the soil present within the field) across which the implement 14 is moved. Specifically, in several embodiments, the vision-based sensor(s) 104 may be provided in operative association with the work vehicle 12 and/or the implement 14 such that the vision-based sensor(s) 104 has a field of view or sensor detection range directed towards a portion(s) of the field adjacent to the work vehicle 12 and or the implement 14. For example, as shown in FIG. 1, in one embodiment, one vision-based sensor 104A may be provided at a forward end 38 of the work vehicle 12 to allow the vision-based sensor 104A to capture image data of a section of the field disposed in front of the work vehicle 12. Similarly, as shown in FIG. 1, a second vision-based sensor 104B may be provided at or adjacent to an aft end 40 of the implement 14 to allow the vision-based sensor 104B to capture image data of a section of the field disposed behind the implement 14. It should be appreciated that, in alternative embodiments, the vision-based sensors 104A, 104B may be installed at any other suitable location(s) on the work vehicle 12 and/or the implement 14. Furthermore, it should be appreciated that the agricultural machine 10 may include only one vision-based sensor assembly 104 mounted on either the work vehicle 12 or the implement 14 or more than two vision-based sensor assemblies 104 mounted on one or both of the work vehicle 12 or the implement 14.

Moreover, it should be appreciated that the vision-based sensor(s) 104 may correspond to any suitable sensing device(s) configured to detect or capture image data or other vision-based data (e.g., point cloud data) associated with the soil present within an associated field of view. For example, in several embodiments, the vision-based sensor(s) 104 may correspond to a suitable camera(s) configured to capture images of the field, such as three-dimensional images of the soil surface or the plants present with in the associated field of view. For instance, in a particular embodiment, the vision-based sensor(s) 104 may correspond to a stereographic camera(s) having two or more lenses with a separate image sensor for each lens to allow the camera(s) to capture stereographic or three-dimensional images. However, in alternative embodiments, the vision-based sensor(s) 104 may correspond to Light Detection and Ranging (LIDAR) sensor(s) or any other suitable vision-based sensing device(s).

Additionally, it should be further appreciated that the configurations of the agricultural machine 10 described above and shown in FIG. 1 is provided only to place the present subject matter in an exemplary field of use. Thus, it should be appreciated that the present subject matter may be readily adaptable to any manner of machine configuration.

Figure 2:
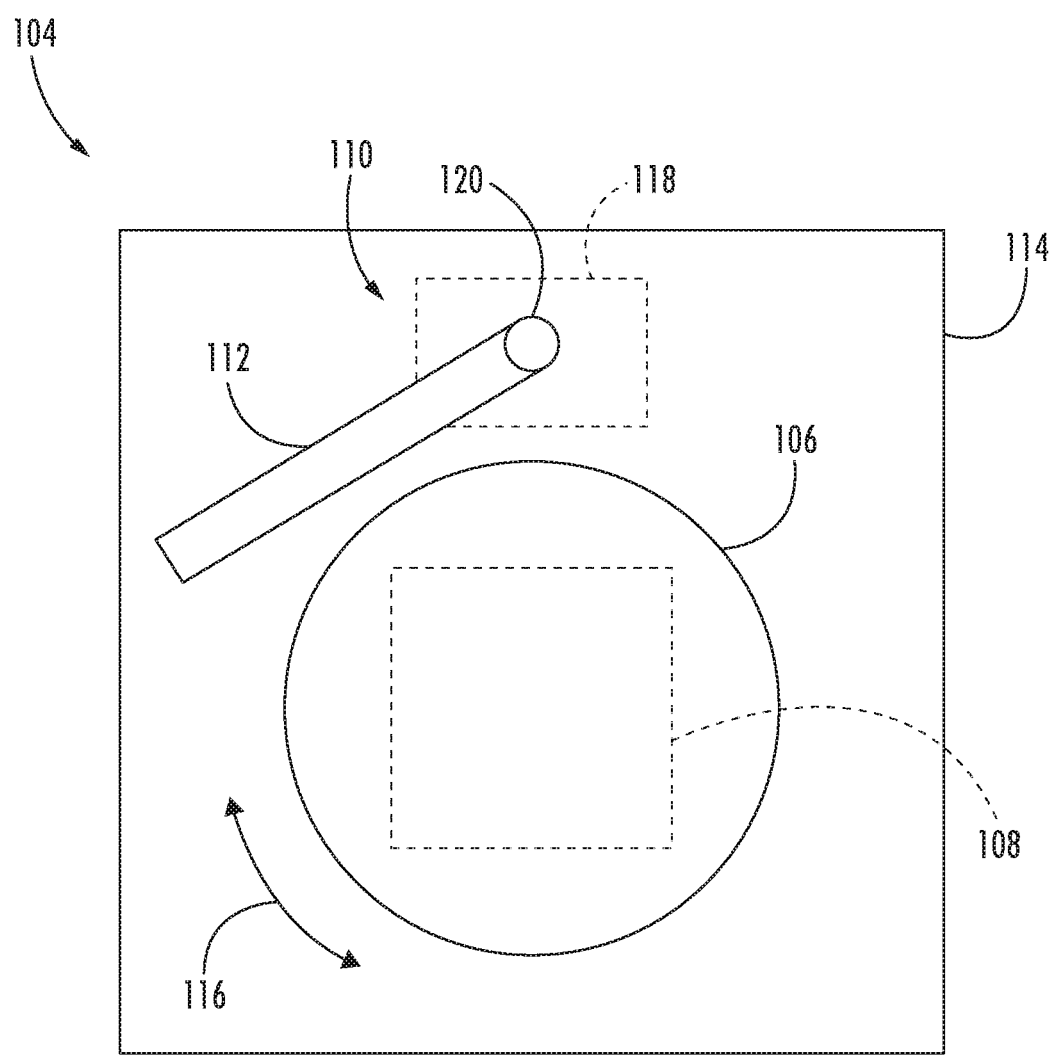
FIG. 2 illustrates a front view of one embodiment of a vision-based sensor for use in the agricultural machine shown in FIG. 1 in accordance with aspects of the present subject matter, particularly illustrating a cleaning system of the sensor.

Referring now to FIG. 2, a front view of one embodiment of one of the vision-based sensors 104 is illustrated in accordance with aspects of the present subject matter. As shown, in the illustrated embodiment, the vision-based sensor 104 corresponds to a camera. In this regard, the vision-based sensor 104 may include one or more lenses 106, with each lens 106 being configured to direct light from the field of view of the vision-based sensor 104 onto an associated image sensor 108, such as a charge coupled device (CCD) image sensor or a complementary metal-oxide semiconductor (CMOS) image sensor. For example, in embodiments in which the vision-based sensor 104 is a stereographic camera, the vision-based sensor 104 may include two lenses 106 and two associated image sensors 108. The image sensor(s) 108 may, in turn, convert the received light into a captured image having a plurality of pixels contained therein. Furthermore, as shown, in one embodiment, the vision-based sensor 104 may include a cleaning system 110 configured to remove particulate matter (e.g., dust) accumulated on the lens 106. Specifically, the cleaning system 110 may include a wiper arm 112 pivotally coupled to a vision-based sensor housing 114. As such, the wiper arm 112 may be configured to pivot relative to the sensor housing 114 (e.g., as indicated by arrow 116 in FIG. 2) in a manner that permits the wiper arm 112 to sweep across at least a portion of the lens 106, thereby removing the accumulated particulate matter from the lens 106. In this regard, the cleaning system 110 may include a suitable actuator 118 (e.g., an electric motor) and an associated linkage assembly 120 configured to pivot or move the wiper arm 112 in the direction 116. However, it should be appreciated that, in alternative embodiments, the vision-based sensor 104 may have any other suitable configuration.

Figure 3:
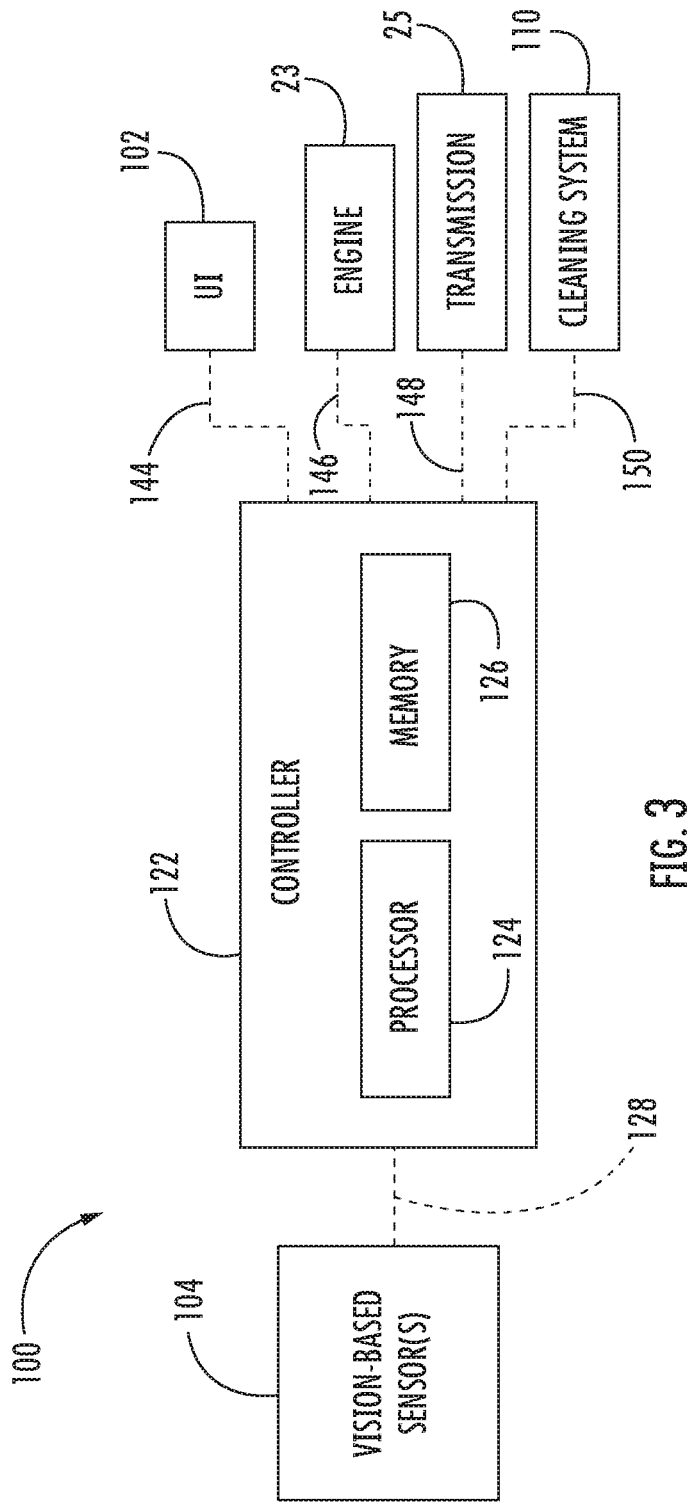
FIG. 3 illustrates a schematic view of one embodiment of a system for monitoring sensor performance on an agricultural machine in accordance with aspects of the present subject matter.

Referring now to FIG. 3, a schematic view of one embodiment of a system 100 for monitoring sensor performance on an agricultural machine is illustrated in accordance with aspects of the present subject matter. In general, the system 100 will be described herein with reference to the agricultural machine 10 described above with reference to FIG. 1. However, it should be appreciated by those of ordinary skill in the art that the disclosed system 100 may generally be utilized with agricultural machines having any other suitable machine configuration.

As shown in FIG. 3, the system 100 may include one or more components of the agricultural machine 10 described above with reference to FIG. 1. For example, in several embodiments, the system 100 may include one or more of the vision-based sensors 104. However, it should be appreciated that the system 100 may include any other suitable components of the agricultural machine 10, such as one or more other components of the work vehicle 12 and/or the implement 14.

Moreover, the system 100 may further include a controller 122 configured to electronically control the operation of one or more components of the agricultural machine 10, such as one or more components of the work vehicle 12 and or the implement 14. In general, the controller 122 may comprise any suitable processor-based device known in the art, such as a computing device or any suitable combination of computing devices. Thus, in several embodiments, the controller 122 may include one or more processor(s) 124 and associated memory device(s) 126 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 126 of the controller 122 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 126 may generally be configured to store suitable computer-readable instructions that, when implemented by the processor(s) 124, configure the controller 122 to perform various computer-implemented functions, such as one or more aspects of the method 200 described below with reference to FIG. 6. In addition, the controller 122 may also include various other suitable components, such as a communications circuit or module, one or more input/output channels, a data/control bus and/or the like.

It should be appreciated that the controller 122 may correspond to an existing controller of the work vehicle 12 or the implement 14 or the controller 122 may correspond to a separate processing device. For instance, in one embodiment, the controller 122 may form all or part of a separate plug-in module that may be installed within the work vehicle 12 or implement 14 to allow for the disclosed system and method to be implemented without requiring additional software to be uploaded onto existing control devices of the work vehicle 12 or implement 14.

Furthermore, in one embodiment, the system 100 may also include a user interface 102. Specifically, the user interface 102 may be communicatively coupled to the controller 122 via a wired or wireless connection to allow feedback signals (e.g., as indicated by dashed line 144 in FIG. 3) to be transmitted from the controller 122 to the user interface 102. As such, the user interface 102 may be configured to provide feedback to the operator of the implement 14 based on the feedback signals 144. The user interface 102 may include one or more feedback devices (not shown), such as display screens, speakers, warning lights, and/or the like, which are configured to communicate such feedback. In addition, some embodiments of the user interface 102 may include one or more input devices (not shown), such as touchscreens, keypads, touchpads, knobs, buttons, sliders, switches, mice, microphones, and/or the like, which are configured to receive user inputs from the operator. In one embodiment, the user interface 102 may be positioned within the operator's cab 24 of the work vehicle 12. However, in alternative embodiments, the user interface 102 may have any suitable configuration and/or be positioned in any other suitable location.

In several embodiments, the controller 122 may be configured to determine an image parameter value for a plurality of images received from the vision-based sensor(s) 104. Specifically, the controller 122 may be communicatively coupled to the vision-based sensor(s) 104, via a wired or wireless connection to allow image data (e.g., as indicated by dashed line 128 in FIG. 3) to be transmitted from the sensor(s) 104 to the controller 122. In this regard, the controller 122 may be configured to receive a plurality of images captured by the vision-based sensor(s) 104, with each image containing a plurality of pixels. Thereafter, the controller 122 may be configured to process or analyze at least a portion of the pixels contained within each of the received images to determine an associated image parameter value for each analyzed pixel. In one embodiment, the controller 122 may be configured to determine the image parameter value for every pixel contained within each received image. However, in another embodiment, the controller 122 may be configured to determine the image parameter value for only a portion of the pixels contained within each received image, such as for pixels at selected locations within the images (e.g., predetermined or randomly determined locations within the images). Such image parameter values may be indicative of the intensity, the color, and/or any other suitable image parameter of the associated pixel. In this regard, the controller 122 may include any suitable image processing algorithms stored within its memory 126 or may otherwise use any suitable image processing techniques to determine the image parameter values associated with the pixels contained within the received images.

Figure 4:
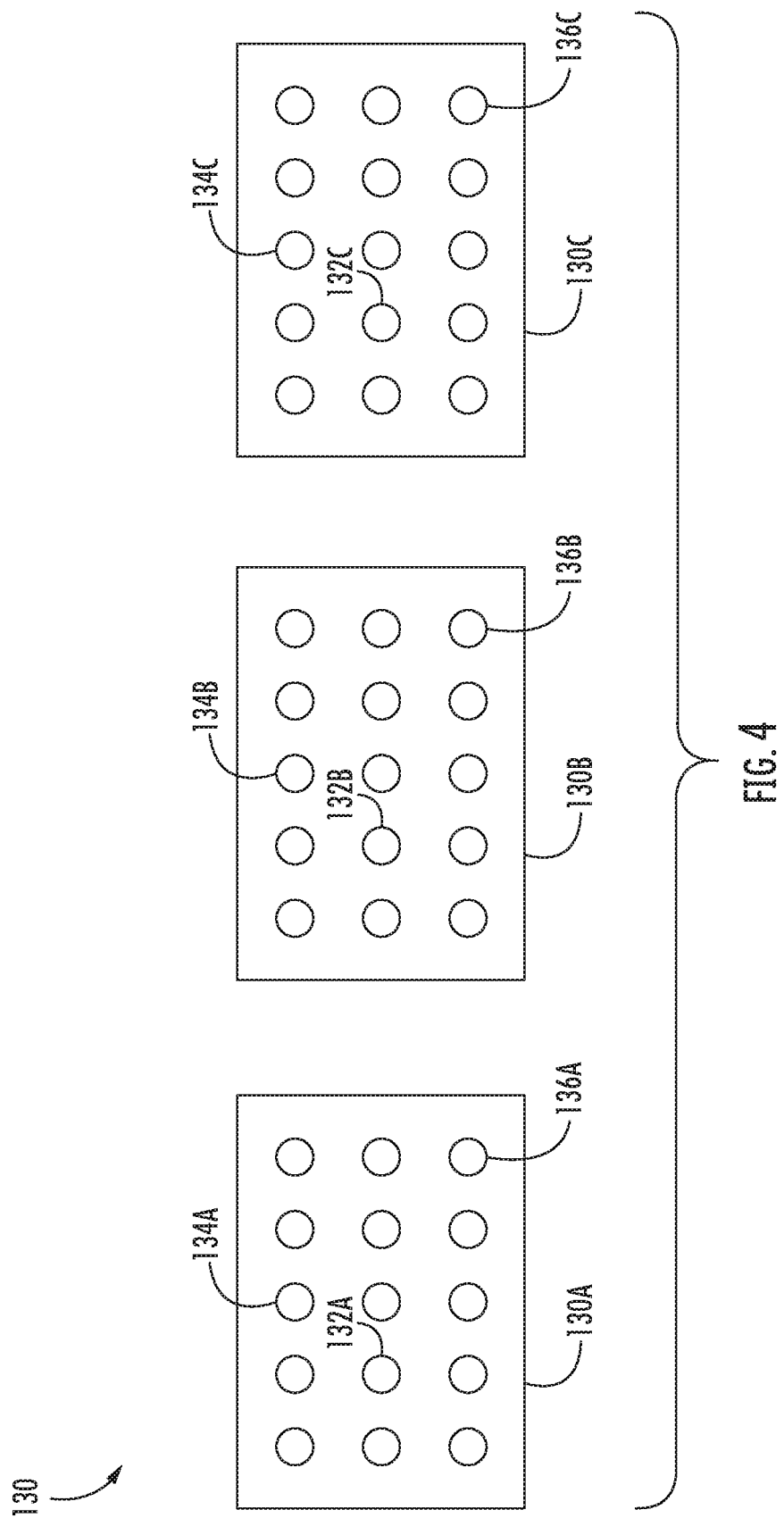
FIG. 4 illustrates an example set of images captured by a vision-based sensor in accordance with aspects of the present subject matter, particularly illustrating a plurality of pixels contained within each of the images.

Referring now to FIG. 4, an example set of a plurality of images 130 received by the controller 122 is illustrated in accordance with aspects of the present subject matter. As shown, the example set of images 130 may include a first image 130A, a second image 130B, and a third image 132C. Furthermore, each of the images 130A-C includes a plurality of pixels, with each pixel being schematically represented by a circle within the corresponding image 130A-C. As indicated above, the controller 122 may be configured to determine an image parameter value associated with at least a portion of the pixels contained within each of the images 130A-C. For example, in one embodiment, the controller 122 may be configured to determine an image parameter value associated with the pixels 132A, 134A, and 136A contained within the first image 130A; the pixels 132B, 134B, and 136B contained within the second image 130B; and the pixels 132C, 134C, and 136C contained within the third image 130C. However, it should be appreciated that, in alternative embodiments, the controller 122 may be configured to determine the image parameter value for any combination of the pixels contained within the images 130A-C. Furthermore, it should be appreciated that each of the pixels 132A-C may correspond to the same respective pixel across each of the images 130A-C. That is, the pixels 132A-C may be captured by the same pixel, photodiode, photodetector, and/or the like of the image sensor 108 (FIG. 2) such that the pixels 132A-C are positioned at the same location within each of the images 130A-C. Similarly, the pixels 134A-C may correspond to the same respective pixel across each of the images 130A-C, and the pixels 136A-C may correspond to the same respective pixel across each of the images 130A-C.

Thereafter, for each respective pixel, the controller 122 may be configured to determine a variance associated with the determined image parameter values (e.g., light intensity) for such respective pixel across the received images. Specifically, in several embodiments, the controller 122 may be configured to calculate the variance in the determined image parameter values for each analyzed pixel across the received images. Such variance may correspond to a differential defined between the image parameter values, the standard deviation of the image parameter values, the range of the image parameter values, and/or any other suitable statistical parameter associated with variance of the image parameter values. Furthermore, in one embodiment, when determining the variance, the controller 122 may be configured to assign weights to the determined image parameter values, such as based on the time when the images were captured by the vision-based sensor(s) 104. In such embodiment, the assigned weights may impact the effect each image parameter value has on the variance calculation. For example, the controller 122 may be configured to assign greater weights to the image parameter values associated with more recently captured images and lower weights to the image parameter values associated with older images. In this regard, the controller 122 may include suitable a mathematical formula(s) stored within its memory 126 for calculating or otherwise determining the variance based on the determined image parameter values.

Referring again to FIG. 4, in the illustrated embodiment, the controller 122 may be configured to determine the variance associated with the image parameter values for the pixels 132, 134, 136. More specifically, the controller 122 may be configured to calculate the variance for the pixel 132 based on the determined image parameter values for the pixel 132A contained within image 130A, the pixel 132B contained within image 130B, and the pixel 132C contained within image 130C. Similarly, the controller 122 may be configured to calculate the variance for the pixel 134 based on the determined image parameter values for the pixel 134A contained within image 130A, the pixel 134B contained within image 130B, and the pixel 134C contained within image 130C. Moreover, the controller 122 may be configured to calculate the variance for the pixel 136 based on the determined image parameter values for the pixel 136A contained within image 130A, the pixel 136B contained within image 130B, and the pixel 136C contained within image 130C. It should be appreciated that the controller 122 may be configured to determine the variance for other pixels contained within the images 130 in a similar manner.

Furthermore, the controller 122 may be configured to identify when a given pixel is obscured or inoperative. Specifically, as the agricultural machine 10 is moved across the field, various objects (e.g., plants, residue, soil, and/or the like) within the field move into and subsequently out of the field(s) of view of the vision-based sensor(s) 104. That is, the images captured by the vision-based sensor(s) 104 may generally change as the agricultural machine 10 is moved across the field. As such, the determined image parameter values (e.g., intensity, color, and/or the like) may vary for each pixel across the received images. In this regard, little or no variance in determined image parameter values for a given pixel may generally be indicative of the given pixel being obscured or inoperative. For example, dust or another particulate may be present on the lens(es) 106 of the vision-based sensor(s) 104 that obscures one or more of the pixels associated image sensor 108. In general, a pixel may be obscured when a translucent or opaque particulate (e.g., dust, dirt, plant matter, and/or the like) reduces the intensity of the light sensed by that pixel of the image sensor 108. As such, a pixel may be obscured when the particulate partially or entirely blocks the light. Furthermore, an inoperative or "dead" pixel may generally be a pixel on the image sensor 108 that is unable to detect light, such as due to a failure of that pixel. Accordingly, in several embodiments, the controller 122 may be configured to compare the determined variance associated with each analyzed pixel to a predetermined variance range. In the event that the determined variance for a given pixel falls outside of the predetermined variance range, the controller 122 may be configured to identify the given pixel as being obscured or inoperative. It should be appreciated that, in alternative embodiments, the controller 122 may be configured to compare the determined variance associated with each analyzed pixel to only one of a predetermined variance maximum threshold or a predetermined variance minimum threshold.

Additionally, in one embodiment, the controller 122 may be configured to identify a given pixel as being obscured or inoperative based on the intensity value of the given pixel. In certain instances (e.g., during daytime operations), when the image sensor(s) 108 of the vision-based sensor(s) 104 are properly functioning, the pixels contained within the captured images generally have a certain threshold level of intensity. As such, a given pixel may generally be obscured or inoperative when the intensity of the given pixel falls below a certain intensity threshold. In this regard, the controller 122 may be configured to compare the determined intensity values for each analyzed pixel within the received images to a predetermined intensity threshold. In the event that the determined intensity for a given pixel falls below the predetermined intensity threshold, the controller 122 may be configured to identify the given pixel as being obscured or inoperative.

In several embodiments, the controller 122 may be configured to determine when the entire vision-based sensor(s) 104 is effectively obscured or inoperative. Specifically, when a number of pixels of the associated image sensor 108 of a vision-based sensor 104 are determined to be obscured or inoperative, the images captured by such vision-based sensor 104 may be of low quality. In such instances, the vision-based sensor 104 as a whole may be considered obscured or inoperative. For example, in one embodiment, the controller 122 may be configured to compare the number of individual pixels that have been identified as being obscured or inoperative to a predetermined threshold amount. In the event that the total number of obscured or inoperative pixels exceeds the predetermined threshold amount, the controller 122 may be configured to identify the associated vision-based sensor 104 as being obscured or inoperative.

In another embodiment, the controller 122 may be configured to determine when the vision-based sensor(s) 104 is effectively obscured or inoperative based on the density of the identified obscured or inoperative pixels. In certain instances, although the total number of obscured or inoperative pixels may be low, such obscured or inoperative pixels may be clustered or grouped together in a manner that obscures a large enough portion of the captured image such that the overall image quality is low. In such embodiment, the controller 122 may be configured to aggregate or group the individual pixels that have been identified as being obscured or inoperative into one or more pixel groups. For example, such pixel groups may be groups of obscured or inoperative pixels clustered together or regions of the captured images. Thereafter, the controller 122 may be configured to determine the density of the pixels (i.e., the number of obscured or inoperative pixels per unit of area) within each pixel group and compare the determined density to a predetermined threshold density value. In the event that the determined density of one or more of the pixel groups exceeds the predetermined threshold density value, the controller 122 may be configured to identify the associated vision-based sensor 104 as being effectively obscured or inoperative.

Figure 5:
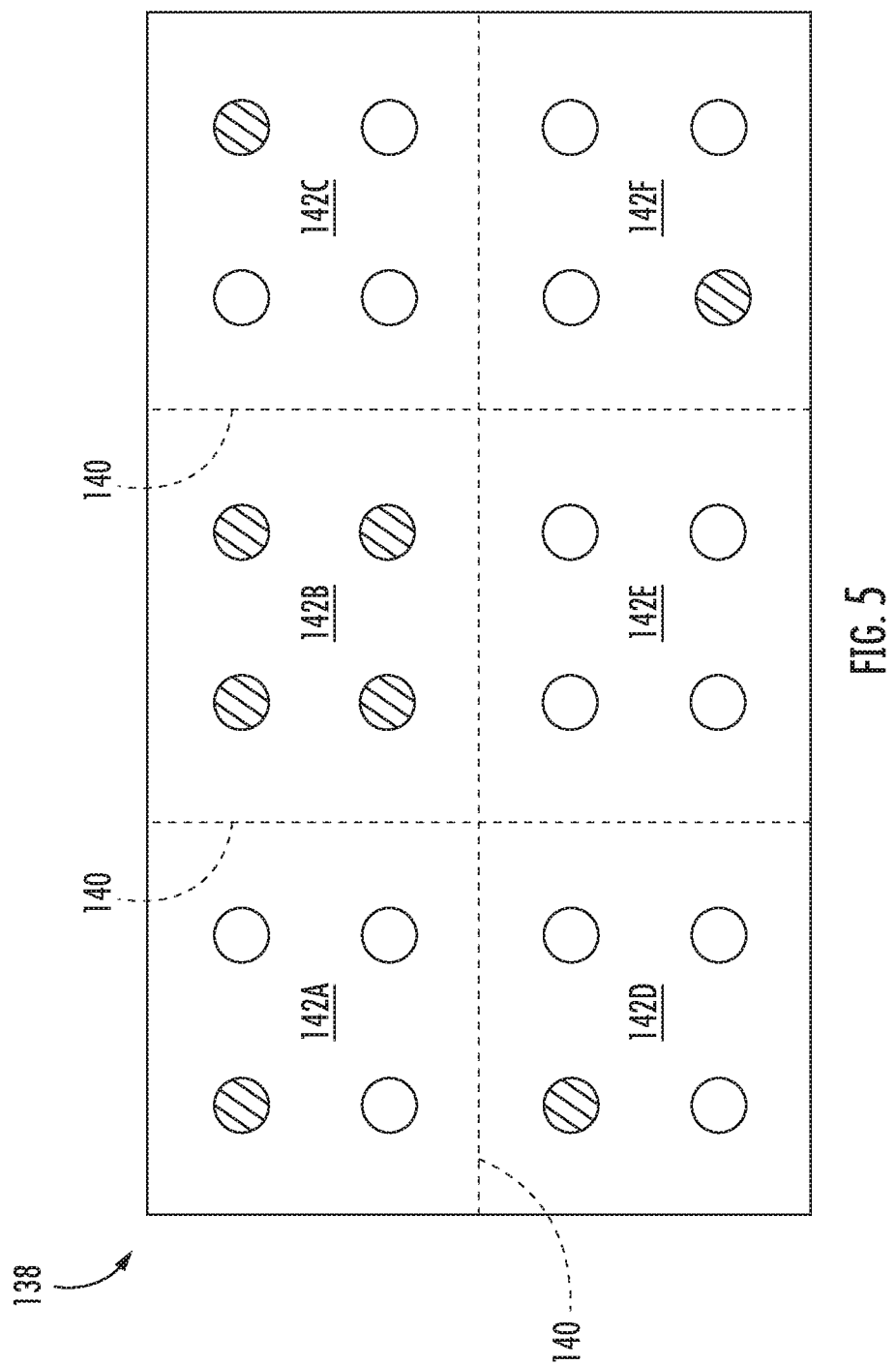
FIG. 5 illustrates an example image captured by a vision-based sensor in accordance with aspects of the present subject matter, particularly illustrating a plurality of pixels contained within the image being aggregated into pixel groups.

Referring now to FIG. 5, an example image 138 captured by one of the vision-based sensors 104 is illustrated in accordance with aspects of the present subject matter. As shown, the image 138 includes a plurality of pixels, with each pixel being schematically represented by a circle. It should be appreciated that the cross-hatched circles represent obscured or inoperative pixels and the empty circles represent unobscured or operative pixels. As indicated above, the controller 122 may be configured to aggregate the obscured or inoperative pixels into one or more pixel groups. In the illustrated embodiment, the controller 122 may be configured to divide the image 138 into six pixel groups 142A-F (e.g., with each pixel group 142A-F being separated by the dashed lines 140 in FIG. 5). It should further be appreciated that, in the illustrated embodiment, for the purposes of description that the density of the obscured or inoperative pixels within the pixel group 142B exceeds above the predetermined threshold density value, while the density of the obscured or inoperative pixels within the pixel groups 142A, 142C-F fall below the predetermined threshold density value. In such instance, the controller 122 may identify the vision-based sensor 104 that captured the image 138 as obscured or inoperative since the density of the obscured or inoperative pixels within at least one of the pixel groups (e.g., the pixel group 142B) exceeds the predetermined threshold density value.

Referring back to FIG. 3, in several embodiments, the controller 122 may be configured to initiate a suitable control action when one or more of the vision-based sensors 104 are identified as being obscured or inoperative. For example, in such instances, in one embodiment, the controller 122 may be configured generate an operator notification (e.g., by causing a visual or audible notification or indicator to be presented to the operator of the work vehicle 12 via the user interface 102) that provides an indication that one or more of the vision-based sensors 104 have been identified as being obscured or inoperative. In such instances, the operator may then choose to initiate any suitable corrective action he/she believes is necessary, such as by reducing the ground speed of or halting the operation of the implement 14 and/or the work vehicle 12.

Moreover, in one embodiment, the controller 122 may be configured to automatically adjust the speed at which the work vehicle 12 is towing the implement 14 across the field when one or more of the vision-based sensors 104 are identified as being obscured or inoperative. Specifically, the controller 122 may be communicatively coupled to the engine 23 and/or the transmission 25 of the work vehicle 12 via a wired or wireless connection to allow control signals (e.g., as indicated by dashed lines 146, 148 in FIG. 3) to be transmitted from the controller 122 to the engine 23 and/or the transmission 25. The signals 146 may be configured to instruct the engine 25 to vary its power output to increase or decrease the speed of the work vehicle 12. For example, when one or more of the vision-based sensors 104 have been identified as being obscured or inoperative, the control signals 146 may instruct the engine 25 to decrease its power output (e.g., by decreasing the fuel flow to the engine 25) such that the speed at which the work vehicle 12 is moved across the field is decreased. Furthermore, the control signals 148 may be configured to instruct the transmission 25 to upshift or downshift to change the speed of the work vehicle 12. For example, one or more of the vision-based sensors 104 have been identified as being obscured or inoperative, the control signals 148 may instruct the transmission 25 to downshift such that the speed at which the work vehicle 12 is moved across the field is decreased. However, it should be appreciated that, in alternative embodiments, the controller 122 may be configured to transmit control signals to any other suitable component of the work vehicle 12 and/or implement 14 such that the speed of the work vehicle 12 and/or implement 14 is adjusted.

Additionally, in another embodiment, the controller 122 may be configured to automatically initiate a cleaning operation of the vision-based sensor(s) 104 that has been identified as obscured or inoperative. Specifically, the controller 122 may be communicatively coupled to the cleaning system(s) 110 (e.g., the associated actuator 118) of the vision-based sensor(s) 104 via a wired or wireless connection to allow control signals (e.g., as indicated by dashed lines 150 in FIG. 3) to be transmitted from the controller 122 to the cleaning assembly 110 (e.g., the associated actuator 118). Such control signals 150 may be configured to instruct the actuator 118 of the cleaning system(s) 110 of the vision-based sensor(s) 104 identified as obscured or inoperative to sweep the associated wiper arm(s) 110 across the associated lens(es) 106, such as in the direction 116, to remove accumulated particulates or otherwise clean the lens(es) 106. In the event the cleaning system(s) 110 is unable to remove the particulates from the lens(es) 106 (e.g., the sensor(s) 104 remain obscured or inoperative after cleaning), the controller 122 may, in one embodiment, be configured to generate an operator notification (e.g., by causing a visual or audible notification or indicator to be presented to the operator of the work vehicle 12 via the user interface 102) that provides an indication that cleaning the vision-based sensor(s) 104 was unsuccessful. In another embodiment, when such cleaning is unsuccessful, the controller 122 may be configured to automatically halt operation of the work vehicle 12 and/or implement 14.

Figure 6:
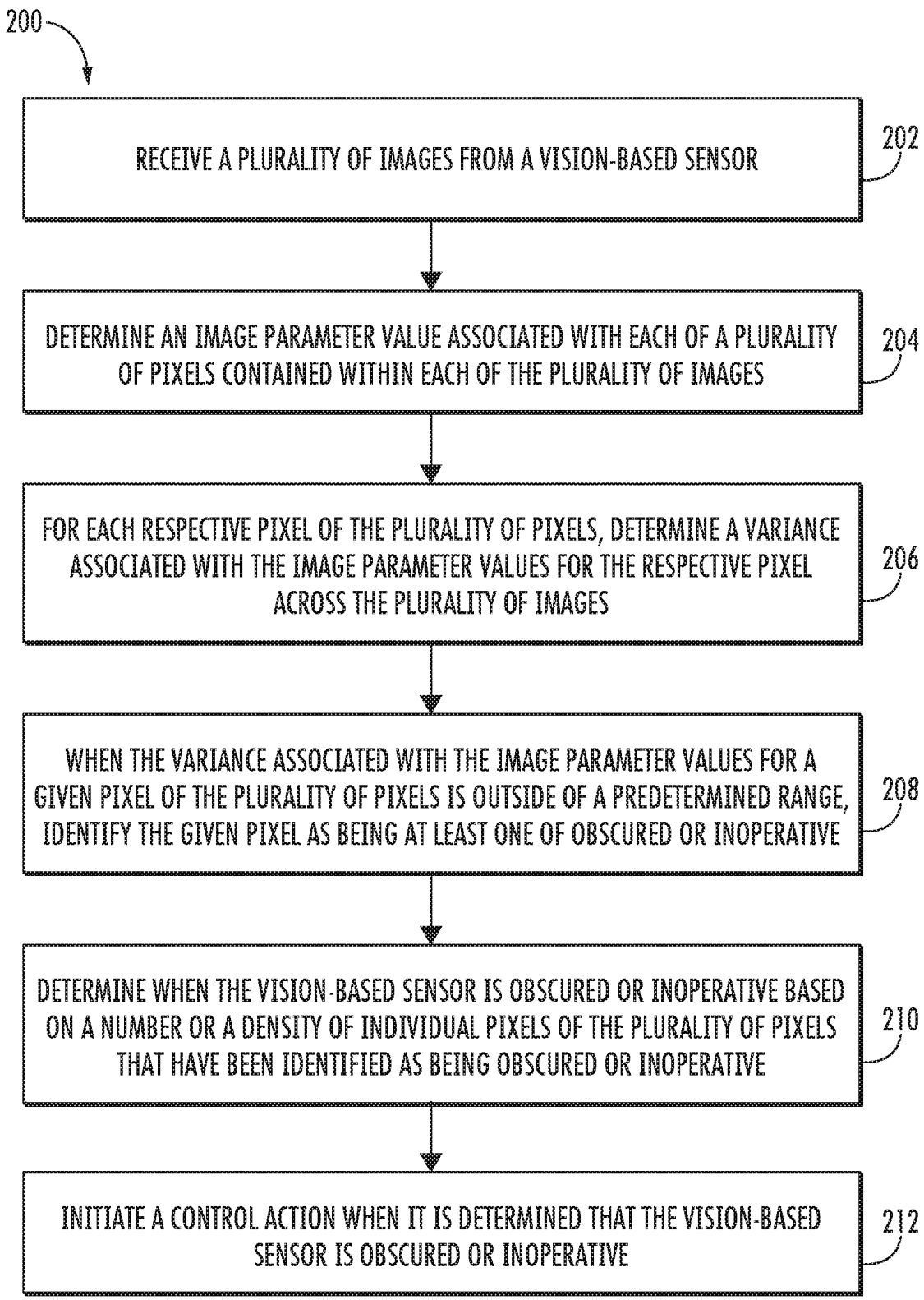
FIG. 6 illustrates a flow diagram of one embodiment of a method for monitoring sensor performance on an agricultural machine in accordance with aspects of the present subject matter.

Referring now to FIG. 6, a flow diagram of one embodiment of a method 200 for monitoring sensor performance on an agricultural machine is illustrated in accordance with aspects of the present subject matter. In general, the method 200 will be described herein with reference to the agricultural machine 10 and the system 100 described above with reference to FIGS. 1-5. However, it should be appreciated by those of ordinary skill in the art that the disclosed method 200 may generally be utilized to monitor sensor performance on any agricultural machine having any suitable machine configuration and/or in connection with any system having any suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (202), the method 200 may include receiving, with a computing device, a plurality of images from a vision-based sensor provided in operative association with an agricultural machine. For instance, as described above, the controller 126 may be communicatively coupled to one or more vision-based sensors 104. As such, the images captured by the vision-based sensor(s) 104 may be received by the controller 126.

Additionally, at (204), the method 200 may include determining, with the computing device, an image parameter value associated with each of a plurality of pixels contained within each of the images received from the vision-based sensor. For instance, as described above, the controller 122 may be configured to determine image parameter value (e.g., a value associated with light, intensity, color, etc.) associated with at least a portion of the pixels contained within each of the received images.

Moreover, as shown in FIG. 6, at (206), the method 200 may include, for each respective pixel of the plurality of pixels, determining, with the computing device, a variance associated with the image parameter values for the respective pixel across the plurality of images. For instance, as described above, the controller 122 may be configured to calculate the variance (e.g., a differential, standard deviation, range, etc.) in the determined image parameter values for each analyzed pixel across the received images.

Furthermore, at (208), the method 200 may include, when the variance associated with the image parameter values for a given pixel of the plurality of pixels is outside of a predetermined range, identifying, with the computing device, the given pixel as being at least one of obscured or inoperative. For instance, as described above, the controller 122 may be configured to identify a given pixel contained within the received images as being obscured or inoperative when the determined variance of the image parameter values for the given pixel falls below a predetermined variance range.

As shown in FIG. 6, at (210), the method 200 may also include determining, with the computing device, when the vision-based sensor is effectively obscured or inoperative based on a number or a density of individual pixels of the plurality of pixels that have been identified as being obscured or inoperative. For instance, as described above, in one embodiment, the controller 122 may be configured to identify one or more of the vision-based sensors 104 as being effectively obscured or inoperative when the number of individual pixels identified as obscured or inoperative exceeds a threshold amount. In another embodiment, the controller 122 may be configured to identify one or more of the vision-based sensors 104 as being effectively obscured or inoperative when the density of pixels identified as being obscured or inoperative within one or more pixel groups exceeds a predetermined density threshold value.

Additionally, at (212), the method 200 may include initiating, with the computing device, a control action when it is determined that the vision-based sensor is obscured or inoperative. As described above, such control actions may include controlling one or more components of the implement 14 and/or the work vehicle 12. For instance, as indicated above, the controller 122 may be configured to automatically initiate a control action that results in the ground speed of the implement 14 and/or the work vehicle 12 being adjusted, such as by automatically controlling the operation of the vehicle's engine 23 and/or transmission 25. Moreover, the controller 122 may also be configured to automatically control the operation of a cleaning system(s) 110 of the vision-based sensor(s) 104 to remove particulates from the associated lens(es) 106.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for monitoring sensor performance on an agricultural machine, the system comprising:
    an agricultural machine;
    a vision-based sensor mounted on the agricultural machine, the vision-based sensor being configured to capture first and second images; and
    a controller communicatively coupled to the vision-based sensor, the controller being configured to:
        receive the first and second images from the vision-based sensor;
        determine an image parameter value associated with each of a plurality of pixels contained within each of the first and second images;
        for each respective pixel of the plurality of pixels, determine a variance between the image parameter value of the respective pixel in the first image and the image parameter value of the respective pixel in the second image; and
        when the variance associated with the image parameter values for a given pixel of the plurality of pixels falls below a threshold value, identify the given pixel as being at least one of obscured or inoperative.

2. The system of claim 1, wherein the image parameter values correspond to at least one of an intensity or a color of the light associated with each of the plurality of pixels.

3. The system of claim 1, wherein the controller is configured to determine the variance in the image parameter values by determining a differential between the image parameter values or determining a standard deviation of the image parameter values.

4. The system of claim 3, wherein, when determining the variance in the image parameter values, the controller is further configured to weight each image parameter value based on a time at which the corresponding first or second image was captured.

5. The system of claim 1, wherein the controller is configured to identify the given pixel as being obscured or inoperative when an intensity of the light detected by the given pixel falls below a predetermined intensity threshold.

6. The system of claim 1, wherein the controller is further configured to identify the vision-based sensor as being obscured or inoperative when a given number of individual pixels of the plurality of pixels that have been identified as being obscured or inoperative exceeds a predetermined threshold amount.

7. The system of claim 1, wherein the controller is further configured to:
    aggregate the individual pixels of the plurality of pixels that have been identified as being obscured or inoperative into one or more pixel groups; and
    identify the vision-based sensor as being obscured or inoperative when a density of the individual pixels within the one or more the pixel groups exceeds a predetermined threshold density value.

8. The system of claim 6, wherein the controller is further configured to initiate a control action when it is determined that the vision-based sensor is obscured or inoperative.

9. The system of claim 8, wherein the control action is associated with notifying an operator of the agricultural machine that the vision-based sensor is obscured or inoperative.

10. The system of claim 8, wherein the control action is associated with reducing a ground speed of the agricultural machine.

11. The system of claim 8, wherein the control action is associated with automatically cleaning the vision-based sensor.

12. The system of claim 1, wherein the vision-based sensor comprises at least one of a camera or a Light Detection and Ranging (LIDAR) sensor.

13. A method for monitoring sensor performance on an agricultural machine, the method comprising:
    receiving, with a computing device, first and second images from the vision-based sensor;
    determining, with the computing device, an image parameter value associated with each of a plurality of pixels contained within each of the first and second images;
    for each respective pixel of the plurality of pixels, determining, with the computing device, a variance between the image parameter value of the respective pixel in the first image and the image parameter value of the respective pixel in the second image;
    when the variance associated with the image parameter values for a given pixel of the plurality of pixels falls below a threshold value, identifying, with the computing device, the given pixel as being at least one of obscured or inoperative;
    determining, with the computing device, when the vision-based sensor is obscured or inoperative based on a number or a density of individual pixels of the plurality of pixels that have been identified as being obscured or inoperative; and
    initiating, with the computing device, a control action when it is determined that the vision-based sensor is obscured or inoperative.

14. The method of claim 13, wherein the image parameter values correspond to at least one of an intensity or a color of the light associated with each of the plurality of pixels.

15. The method of claim 13, wherein determining the variance in the image parameter values comprises determining, with the computing device, a differential between the image parameter values or determining, with the computing device, a standard deviation of the image parameter values.

16. The method of claim 15, wherein determining the variance in the image parameter values comprises weighting, with the computing device, each image parameter value based on a time at which the corresponding first or second image was captured.

17. The method of claim 13, further comprising:
identifying, with the computing device, the given pixel as being obscured or inoperative when an intensity of the light detected by the given pixel falls below a predetermined intensity threshold.

18. The method of claim 13, wherein determining when the vision-based sensor is obscured or inoperative comprises identifying, with the computing device, the vision-based sensor as being obscured or inoperative comprises when a given number of individual pixels of the plurality of pixels that have been identified as being obscured or inoperative exceeds a predetermined threshold amount.

19. The method of claim 13, wherein determining when the vision-based sensor is obscured or inoperative comprises:
aggregating, with the computing device, the individual pixels of the plurality of pixels that have been identified as being obscured or inoperative into one or more pixel groups; and
identifying, with the computing device, the vision-based sensor as being obscured or inoperative when a density of the individual pixels within the one or more the pixel groups exceeds a predetermined threshold density value.

20. The system of claim 8, wherein the control action is associated with reducing a ground speed of the agricultural machine.

\* \* \* \* \*